United States Patent
Tokito

(10) Patent No.: US 9,895,769 B2
(45) Date of Patent: Feb. 20, 2018

(54) LASER PROCESSING DEVICE HAVING FUNCTION FOR AVOIDING INTERFERENCE AT THE TIME OF NOZZLE APPROACH

(71) Applicant: FANUC CORPORATION, Minamitsuru-gun, Yamanashi (JP)

(72) Inventor: Hiroaki Tokito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/978,567

(22) Filed: Dec. 22, 2015

(65) Prior Publication Data

US 2016/0184923 A1    Jun. 30, 2016

(30) Foreign Application Priority Data

Dec. 25, 2014  (JP) .................................. 2014-263248

(51) Int. Cl.
*B23K 26/04*      (2014.01)

(52) U.S. Cl.
CPC ................................... *B23K 26/048* (2013.01)

(58) Field of Classification Search
CPC .... B23K 26/03; B23K 26/035; B23K 26/048; G05B 2219/45041
USPC .............. 219/121.78, 121.79, 121.8, 121.81, 219/121.82
See application file for complete search history.

(56) References Cited

U.S. PATENT DOCUMENTS

| | | | | |
|---|---|---|---|---|
| 5,067,086 A | * | 11/1991 | Yamazaki ............ | B23K 26/046 219/121.79 |
| 5,293,024 A | | 3/1994 | Sugahara et al. | |
| 6,870,130 B2 | * | 3/2005 | Yamazaki .......... | B23K 26/0853 219/121.83 |
| 7,566,844 B2 | * | 7/2009 | Egawa ................... | B23K 26/04 219/121.78 |
| 2013/0103183 A1 | | 4/2013 | Mochida | |

FOREIGN PATENT DOCUMENTS

| | | |
|---|---|---|
| CN | 101468422 A | 7/2009 |
| DE | 102012109867 A1 | 4/2013 |
| JP | 62279093 | 12/1987 |
| JP | 01218780 | 8/1989 |
| JP | 03071988 | 3/1991 |
| JP | 03110091 | 5/1991 |
| JP | 10328868 | 12/1998 |
| JP | 2000-343255 A | 12/2000 |

* cited by examiner

*Primary Examiner* — Dana Ross
*Assistant Examiner* — James Sims, III
(74) *Attorney, Agent, or Firm* — RatnerPrestia

(57) ABSTRACT

A laser processing device having a function for avoiding interference during an approach motion of a processing nozzle of the laser processing device. When a distance between a processing nozzle and a workpiece is equal to a setting value where gap control can be started, it is judged as to whether or not the mechanical position of the processing nozzle is above a predetermined processing start position. When the mechanical position of the processing nozzle is higher than the processing start position, a controller judges that an abnormality occurs by which laser processing cannot be carried out, and automatically stops the approach motion of the processing nozzle.

4 Claims, 3 Drawing Sheets

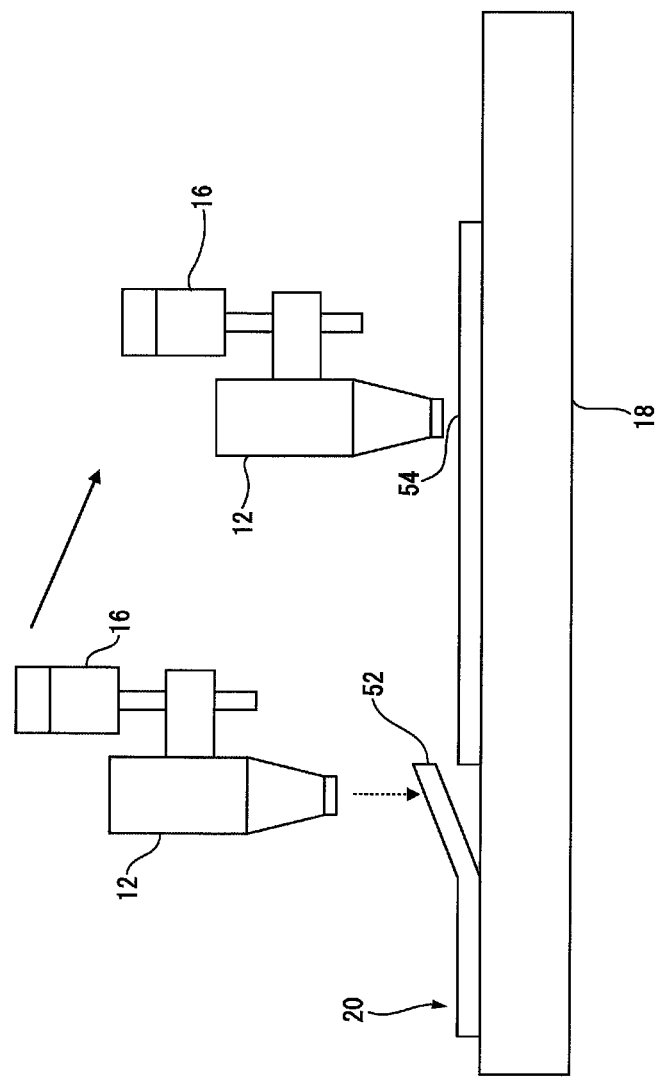

LASER PROCESSING DEVICE HAVING FUNCTION FOR AVOIDING INTERFERENCE AT THE TIME OF NOZZLE APPROACH

BACKGROUND OF THE INVENTION

1. Field of the Invention

The present invention relates to a laser processing device configured to change a distance between a processing nozzle and an object to be processed.

2. Description of the Related Art

Generally, laser processing is carried out while executing gap control for maintaining a distance (gap) between an object to be processed (or a workpiece) and a processing nozzle for irradiating a laser beam at a predetermined value. As an example of the gap control, JP 2000-343255 A discloses that a gap sensor is arranged on a nozzle in order to detect the distance between the nozzle and a workpiece, and a profile control is carried out based on a signal from the gap sensor.

In the gap control, when a processing nozzle approaches a workpiece, a gap sensor for detecting a gap between the nozzle and the workpiece continues to output a maximum value until a surface of the workpiece enters a detection range of the gap sensor. On the other hand, the velocity of a control axis (such as an axis for driving the processing nozzle) for controlling the gap is normally calculated from a detection value of the gap sensor and a gain setting value for determining a motion velocity. In this regard, the gain is set to a relatively high value during the approach motion of the nozzle, since the approach motion must be at high speed. Otherwise, until the processing nozzle is moved or lowered to a certain height position in the vicinity of the surface of the workpiece, the processing nozzle may be rapidly lowered at an approach motion velocity determined without depending on the detection value of the gap sensor (i.e., the approach motion velocity is higher than the velocity calculated from the sensor detection value and the gain setting value).

However, if the approach motion velocity is high, even when the control axis of the processing nozzle is decelerated after the existence of an obstacle between the processing nozzle and the workpiece is detected or after an abnormality (such as excess inclination or warpage) of the workpiece is detected, the processing nozzle may collide or interfere with the obstacle, etc., and may be damaged.

In the technique of JP 2000-343255 A, the sensor detects the processing nozzle approaches the surface of the workpiece during the approach motion, and the gain for the gap control motion is switched between before and after the approach of the processing nozzle (in other words, the gain is maintained to a relatively high value before the processing nozzle approaches the workpiece, and the gain is decreased as the nozzle gets closer to the workpiece). However, the technique of this document is intended to reduce an approach motion time of the processing nozzle. Although this document describes that it is detected that the nozzle approaches the workpiece, a means for avoiding interference between the nozzle and the workpiece is not considered. Further, an actual mechanical position of a nozzle axis based on an output from a position detector is not considered in this document.

SUMMARY OF THE INVENTION

An object of the present invention is to provide a laser processing device having a function for avoiding interference during an approach motion of a processing nozzle of the device.

Accordingly, the invention provides a laser processing device comprising: a processing nozzle configured to be moved toward or away from an object to be processed and configured to irradiate a laser beam; a gap sensor which detects a distance between the processing nozzle and the object; and a controller which carries out laser processing with respect to the object by controlling a motion of the processing nozzle, while executing gap control for controlling the distance between the processing nozzle and the object based on a detection value of the gap sensor, wherein the controller stops an approach motion of the processing nozzle toward the object, when the gap sensor detects that the distance between the processing nozzle and the object is equal to a setting value in which the gap control can be started, while the processing nozzle is positioned at a position higher than a predetermined processing start position.

In a preferred embodiment, after the approach motion is stopped, the controller carries out an evacuation motion for moving the processing nozzle away from the object.

In this case, with respect to a processing program for carrying out the laser processing, the controller may search a subsequent command block next to a command block executed when the approach motion is stopped, and may continue the laser processing from the subsequent command block.

In a preferred embodiment, with respect to a processing program for carrying out the laser processing, the controller stores information regarding a command block executed when the approach motion is stopped, and informs an operator of the information.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 3 shows a view explaining an example in which a processing nozzle skips to another processing point.

DETAILED DESCRIPTION

Figure 1:
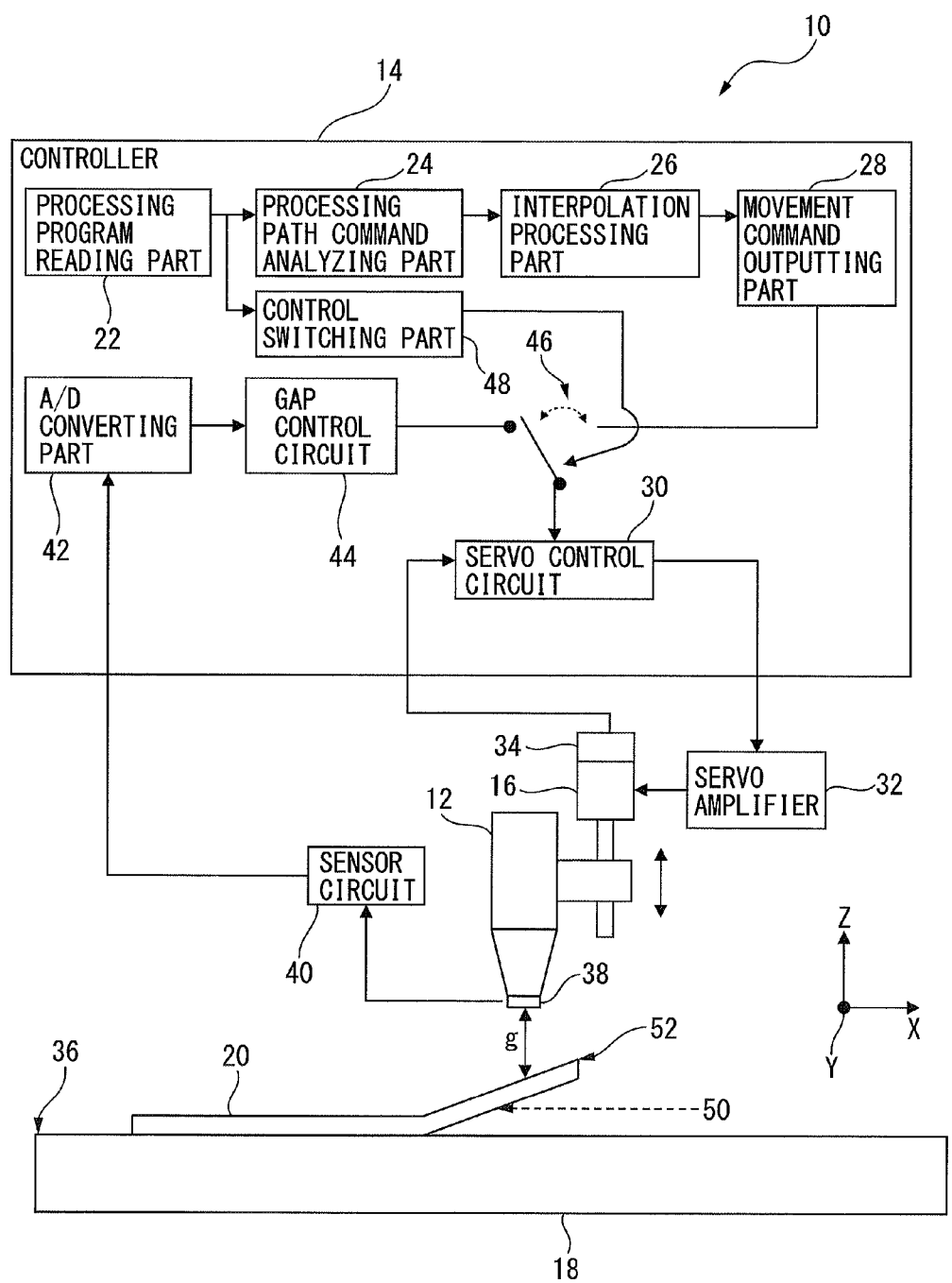
FIG. 1 shows a schematic configuration of a major section of a laser processing device according to a preferred embodiment of the present invention.

FIG. 1 shows a schematic configuration of a major section of a laser processing device according to a preferred embodiment of the present invention. Laser processing device 10 has a processing nozzle 12 which irradiates a laser beam, and a controller 14 which controls a motion of processing nozzle 12. Processing nozzle 12 is configured to be moved relative to an object 20 to be processed (or a workpiece) positioned on a table 18, in a direction of a processing nozzle axis (in the drawing, a Z-direction generally perpendicular to a surface of the workpiece) and X- and Y-directions orthogonal to the Z-direction and orthogonal to each other, by using at least one servomotor 16.

Controller 14 has a processing program reading part 22 which reads a processing program for processing workpiece 20 in laser processing device 10, from a memory or the like (not shown); a processing path command analyzing part 24 which analyzes a processing path command regarding a processing path of workpiece 20, included in the processing program; an interpolation processing part 26 which executes an interpolation process between a plurality of points on the processing path; and a movement command outputting part 28 which generates and outputs a movement command for processing nozzle 12 based on an analysis result of processing path command analyzing part 24 and a processing result of interpolation processing part 26.

The movement command, which is output from movement command outputting part 28, is transmitted to a servo control circuit 30. Based on the movement command, servo control circuit 30 controls a servo amplifier 32 connected to servomotor 16. By virtue of this, processing nozzle 12 can be moved along the processing path determined with respect to workpiece 20. A mechanical position of processing nozzle 12 (for example, the position of processing nozzle 12 in a coordinate system defined at a fixed position of laser processing device 10) may be detected by a position detector 34 (such as an encoder) arranged on servomotor 16. Concretely, a proper position (for example, a corner 36 of table 18) of laser processing device 10 may be defined as a reference position (or the origin), and position detector 34 may detect the mechanical position of processing nozzle 12 relative to the reference position.

Processing nozzle 12 has a gap sensor 38 which detects a distance (or a gap) g between the surface of workpiece 20 and (a front end of) processing nozzle 12, and then a detection value (or a detection signal) of gap sensor 38 is A/D converted by an A/D converting part 42 of controller 14 via a sensor circuit 40. Controller 14 has a gap control circuit 44 which transmits a gap control command for controlling gap g to servo control circuit 30, and a control switching part 48 which switches the command transmitted to servo control circuit 30, between the gap control command and the movement command from movement command outputting part 28, by using a three-way switch 46, etc.

In laser processing device 10, workpiece 20 is processed by irradiating the laser beam from processing nozzle 12, while carrying out the gap control in which the distance between processing nozzle 12 and workpiece 20 detected by gap sensor 38 is maintained at a predetermined laser processing gap by gap control circuit 44. Hereinafter, with reference to a flowchart of FIG. 2, an example of the procedure in the laser processing device according to the embodiment will be explained.

First, in step S1, by using position detector 34, monitoring of the mechanical position of processing nozzle 12 (or the processing nozzle axis) is started. Next, in step S2, an approach motion of processing nozzle 12 relative to workpiece 20 is started. This approach motion is continued until gap g between the front end of processing nozzle 12 and the surface of workpiece 20 is equal to a setting value (for example, 5 mm to 20 mm) in which the gap control can be started (step S3).

When gap g is increased to the setting value in which the gap control can be started, in step S4, it is judged as to whether the mechanical position of processing nozzle 12 monitored in step S1 is above or below a predetermined processing start position (processing start height). For example, the processing start position refers to a position where gap g may be equal to the setting value without causing interference (collision) between (the front end of) processing nozzle 12 and workpiece 20, when the shape of workpiece 20 is normal (i.e., workpiece 20 does not have an inclination, warpage or deformation). In other words, the processing start position (height) is determined as a position corresponding to the mechanical position of processing nozzle 12 where gap g is equal to the setting value, or is determined as a position where a predetermined margin is added to the mechanical position, when workpiece 20 does not have an abnormality by which a desired laser processing cannot be carried out.

When the mechanical position of processing nozzle 12 is equal to or below the predetermined processing start position at the time when gap g is equal to the setting value, it can be judged that workpiece 20 is in a normal state, and then the procedure progresses to step S5 so that the approach motion of processing nozzle 12 is continued. Then, when the approach motion is completed, a laser beam is irradiated from the front end of processing nozzle 12 so as to start the laser processing of workpiece 20 (step S6).

On the other hand, when the mechanical position of processing nozzle 12 is above the predetermined processing start position (or is positioned at the counter side of the workpiece) in step S4, it is judged that workpiece 20 has an unusual shape such as a warpage 52, workpiece 20 is excessively inclined from the normal posture, or another obstacle exists between processing nozzle 12 and workpiece 20, for example. In this case, controller 14 judges that there is an abnormality by which the laser processing cannot be carried out, and then the procedure progresses to step S7 so as to automatically stop the feeding (or the approach motion) of processing nozzle 12. At this point of time, the operator can take appropriate measures, for example, the operator can remove the obstacle or replace workpiece 20 with another workpiece, etc.

As explained above, after processing nozzle 12 approaches workpiece 20, the position (height) of the nozzle at the time when irradiating the laser beam so as to start the laser processing is previously stored in controller 14. Then, the positional information from position detector 34 arranged on motor 16 for driving processing nozzle 12 is constantly compared to the nozzle position (or the processing start position) at the time when the laser processing is started, which is preset in controller 14. When gap sensor 38 responds while the processing nozzle is positioned above the determined mechanical position (or at the counter workpiece side), it can be judged that an abnormality by which the laser processing cannot be carried out is detected (for example, the obstacle exists, or workpiece 20 has an excess warpage or inclination, etc.). Therefore, by stopping the axis of processing nozzle 12 (in this case, the feed axis along the Z-direction), interference or collision between processing nozzle 12 and workpiece 20 can be avoided, and a damage of processing nozzle 12 due to the interference or collision can also be avoided.

Optionally, step S8 may be added after step S7, in which controller 14 suspends the processing program and (preferably, automatically) executes an evacuation motion so as to raise processing nozzle 12 to a predetermined evacuation position (or move processing nozzle 12 away from the workpiece). As such, when the obstacle or the abnormality of workpiece 20 is detected, the processing program is suspended and the feeding of the axis of processing nozzle 12 is stopped, and then, processing nozzle 12 is raised by an arbitrary distance or is moved to the predetermined evacuation position (or the reference position). By virtue of this, a safe operation area for removing the obstacle, etc., by the operator can be automatically obtained. In addition, as explained below, a command block of the processing program, executed when the obstacle, etc., is detected, may be skipped, in order to reduce an operation time for searching the next processing start point and continuing the laser processing.

Optionally, step S9 may be added after step S7 or S8, in which information regarding a command block of the processing program, at the time when the abnormality, etc., of workpiece 20 is detected (or when the approach motion of processing nozzle 12 is stopped), is stored in a proper memory, and then the information regarding the command block is displayed on a proper screen and/or is output by voice, etc. In other words, in step S9, controller 14 (preferably, automatically) informs the operator of the information regarding the command block when the abnormality occurs. When the obstacle, etc., is detected, the execution of the processing program may be suspended in order to avoid the interference between processing nozzle 12 and the obstacle, etc., or the execution of the processing program may be continued by circumventing or skipping a site of occurrence of the obstacle and the site of occurrence of the obstacle may be processed after the series of processing is completed. In such a case, by informing the operator of the site of occurrence of the obstacle in the processing program, time and effort required for an initial setup of an additional processing by the operator can be reduced.

Optionally, step S10 may be added after processing nozzle 12 is raised to the predetermined evacuation position (or after step S8 or S9), in which controller 14 (preferably automatically) searches a subsequent command block next to a command block executed when the abnormality is detected (or when the approach motion of processing nozzle 12 is stopped), in the processing program, and continues the laser processing from the subsequent command block.

Figure 2:
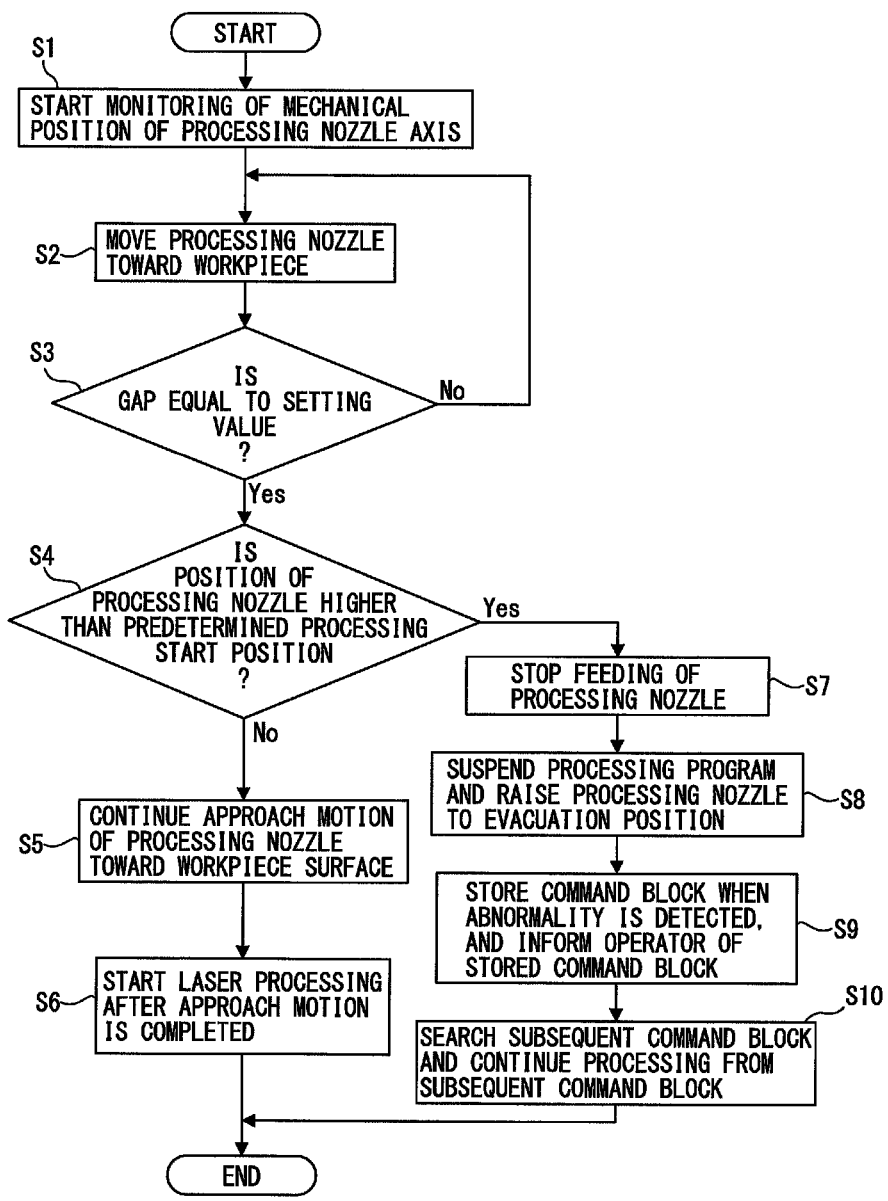
FIG. 2 shows a flowchart of an example of a procedure using the laser processing device of FIG. 1.

FIG. 3 shows an example explaining the procedure regarding step S10. When processing nozzle 12 is raised to the evacuation position by the procedure in step S8, controller 14 searches the subsequent command block (for example, a block for commanding a cutting process or piercing process on a site 54 of workpiece 20 different from warpage 52) next to the command block executed when the abnormality is detected, and moves processing nozzle 12 above site 54. Then, the procedure as shown in FIG. 2 is repeated. As such, the processing can be automatically continued, in which only the site of occurrence of the obstacle of workpiece 20 can be skipped or circumvented, by raising processing nozzle 12 by the arbitrary distance after the obstacle, etc., is detected and the feeding of the axis of processing nozzle 12 is stopped; by searching the subsequent command block of the processing program by using controller 14; and by carrying out the processing from the subsequent command block.

In the above embodiment, processing nozzle 12 is movable relative to fixed table 18 (workpiece 20). Alternatively, processing nozzle 12 may be movable only in the direction (the Z-direction) toward or away from workpiece 20, and table 18 may be movable in the X- and Y-directions (i.e., in the X-Y plane). Otherwise, processing nozzle 12 may be fixed, and table 18 may be movable in the X-, Y- and Z-directions.

According to the present invention, if the position of the processing nozzle is higher than the predetermined processing start position when the distance between the processing nozzle and the object to be processed (or the workpiece) is equal to the setting value where the gap control can be started, it can be predicted that the workpiece has the abnormality or the obstacle exists, and thus the approach motion of the processing nozzle can be stopped by the controller. Therefore, the processing nozzle can be automatically prevented from interfering or colliding with the workpiece or the obstacle, and thus the laser processing can be efficiently carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser processing device comprising:
   a processing nozzle configured to be moved toward or away from an object to be processed and configured to irradiate a laser beam;
   a gap sensor which detects a distance between the processing nozzle and the object;
   a position detector which detects a position of the processing nozzle relative to a fixed predetermined start position; and
   a controller configured to execute a processing program for carrying out laser processing of the object by controlling a motion of the processing nozzle, while executing gap control for controlling the distance between the processing nozzle and the object based on a detection value of the gap sensor,
   wherein the controller receives a gap signal from the gap sensor and a position signal from the position detector, and executes the processing program to stop an approach motion of the processing nozzle toward the object, in response to:
   1) the controller determining from the received gap signal that the gap sensor detects that the distance between the processing nozzle and the object is equal to a setting value in which the gap control can be started, and
   2) the controller determining from the received position signal that the position detector detects that the processing nozzle is positioned at a position higher than the fixed predetermined start position.

2. The laser processing device as set forth in claim 1, wherein, after the approach motion is stopped, the controller carries out an evacuation motion for moving the processing nozzle away from the object.

3. The laser processing device as set forth in claim 2, wherein, the controller executes a processing program for carrying out the laser processing, the controller searches a subsequent command block of the processing program next to a command block of the processing program executed when the approach motion is stopped, the command block indicating commands for carrying out laser processing at a first location on the object, the subsequent command block indicating commands for carrying out laser processing at a second location on the object different from the first location, and continues the laser processing from the subsequent command block of the processing program at the second location.

4. The laser processing device as set forth in claim 1, wherein the controller executes a processing program for carrying out the laser processing, the controller stores information regarding a command block of the processing program executed when the approach motion is stopped, and informs an operator of the information, the command block indicating commands for carrying out laser processing at a first location on the object.

* * * * *